United States Patent
Yamagiwa et al.

(10) Patent No.: US 6,334,918 B1
(45) Date of Patent: *Jan. 1, 2002

(54) TIRE TUBE

(75) Inventors: Toshio Yamagiwa; Hirohisa Takahashi; Kengo Nakayama; Katsutoshi Yamazaki, all of Saitama (JP)

(73) Assignee: Honda Giken Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/884,639

(22) Filed: Jun. 27, 1997

(30) Foreign Application Priority Data

Jun. 27, 1996 (JP) .................................... 8-168009

(51) Int. Cl.⁷ ..................................... B29D 23/24
(52) U.S. Cl. .......................... 156/115; 152/506; 156/120; 156/122
(58) Field of Search .................... 152/506, 503, 152/507, 511, 339.1, 340.1; 156/115, 118, 122, 120

(56) References Cited

U.S. PATENT DOCUMENTS

| | | | |
|---|---|---|---|
| 780,140 A | * 1/1905 | Taylor | 152/339.1 |
| 836,569 A | * 11/1906 | Dow | 152/506 |
| 1,419,470 A | 6/1922 | Reasoner et al. | |
| 1,689,907 A | * 10/1928 | Allen | 152/507 |
| 1,952,221 A | * 3/1934 | Ronneberg | 152/511 |
| 2,126,771 A | * 8/1938 | Hanson | 152/367 |
| 2,550,566 A | * 4/1951 | Iknayan et al. | 156/122 |
| 2,582,770 A | * 1/1952 | Cornell | 152/367 |
| 2,638,961 A | * 5/1953 | Everett, Sr. | 156/97 |
| 2,945,532 A | * 7/1960 | De Filippo | 156/122 |
| 3,186,468 A | 6/1965 | Cherniaew | |
| 3,397,100 A | * 8/1968 | Christie | 156/97 |
| 5,385,191 A | * 1/1995 | Aflague et al. | 152/339.1 |

FOREIGN PATENT DOCUMENTS

| | | | | |
|---|---|---|---|---|
| DE | 200672 C | 5/1906 | | |
| FR | 2102954 A | 4/1972 | | |
| GB | 193478 | 2/1923 | | |
| GB | 377163 | * 1/1931 | | 152/503 |
| JP | A-58 74342 | 5/1983 | | |
| KR | 9621568 | 7/1996 | | |

* cited by examiner

Primary Examiner—Geoffrey L. Knable

(57) ABSTRACT

A tube tire for avoiding damage to a tube in charging a sealant, and for preventing the sealant from plugging an air valve of the tube. A first tube half and a second tube half have the same side and circular cross sections are joined together as raw rubber, and then vulcanized, thereby forming a tube consisting of the two tube halves and integrated in a seamless condition. An air chamber is defined in the first tube half, and a sealant chamber is filled with a sealant and is defined in the second tube half. When the tube is pierced, the sealant repairs a pierced hole to prevent the puncture. Further, the air chamber is separated from the sealant chamber, so that an air valve provided on the air chamber is not plugged with the sealant.

11 Claims, 6 Drawing Sheets

TIRE TUBE

BACKGROUND OF THE INVENTION

1. Field of the Invention

The present invention relates to a tube tire including a tire adapted to be mounted on an outer circumference of a rim, and a tube accommodated in a space adapted to be defined by the rim and the tire.

2. Description of Background Art

When a general tube tire is pierced by a nail or the like, the air in the tube passes from a pierced hole of the tube through a fine gap between the tire and the tube to a nipple hole of a rim, and leaks from the nipple hole to the outside, thus readily developing a puncture.

It is known to preliminarily inject into a tube a proper amount of liquid sealant for automatically temporarily repairing a pierced hole opened through the tube (see Japanese Patent Laid-open No. 58-74342).

However, in the above conventional tube tire, a capsule filled with the sealant is preliminarily put in the tube in forming the tube, and the capsule is broken to charge the sealant into the tube after forming the tube. Accordingly, the tube is apt to be damaged in applying an external force to the capsule to break it. Further, in some cases, the sealant may plug an air valve of the tube or may plug a pressure gauge in measuring an air pressure in the tube.

It is accordingly an object of the present invention to provide a tube tire which can eliminate any damage to a tube in charging a sealant, and can prevent the sealant from plugging an air valve of the tube.

According to the present invention, a tube tire is provided which includes a tire adapted to be mounted on an outer circumference of a rim, and a tube accommodated in a space adapted to be defined by said rim and said tire. The tube is formed by joining a first tube half and a second tube half formed of raw rubber wherein each includes a circular cross section at substantially a half way point of an outer circumferential surface of each tube. The tube is then vulcanized wherein the first and second tube halves are joined together. An air chamber is adapted to be filled with air being defined in said first tube half located radially inside of said tire. A sealant chamber is adapted to be filled with a sealant being defined in said second tube half located radially outside of said tire.

According to the present invention, the first tube half and said second tube half have the same diameter in their free condition.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A preferred embodiment of the present invention will now be described with reference to the attached drawings.

Figure 1:
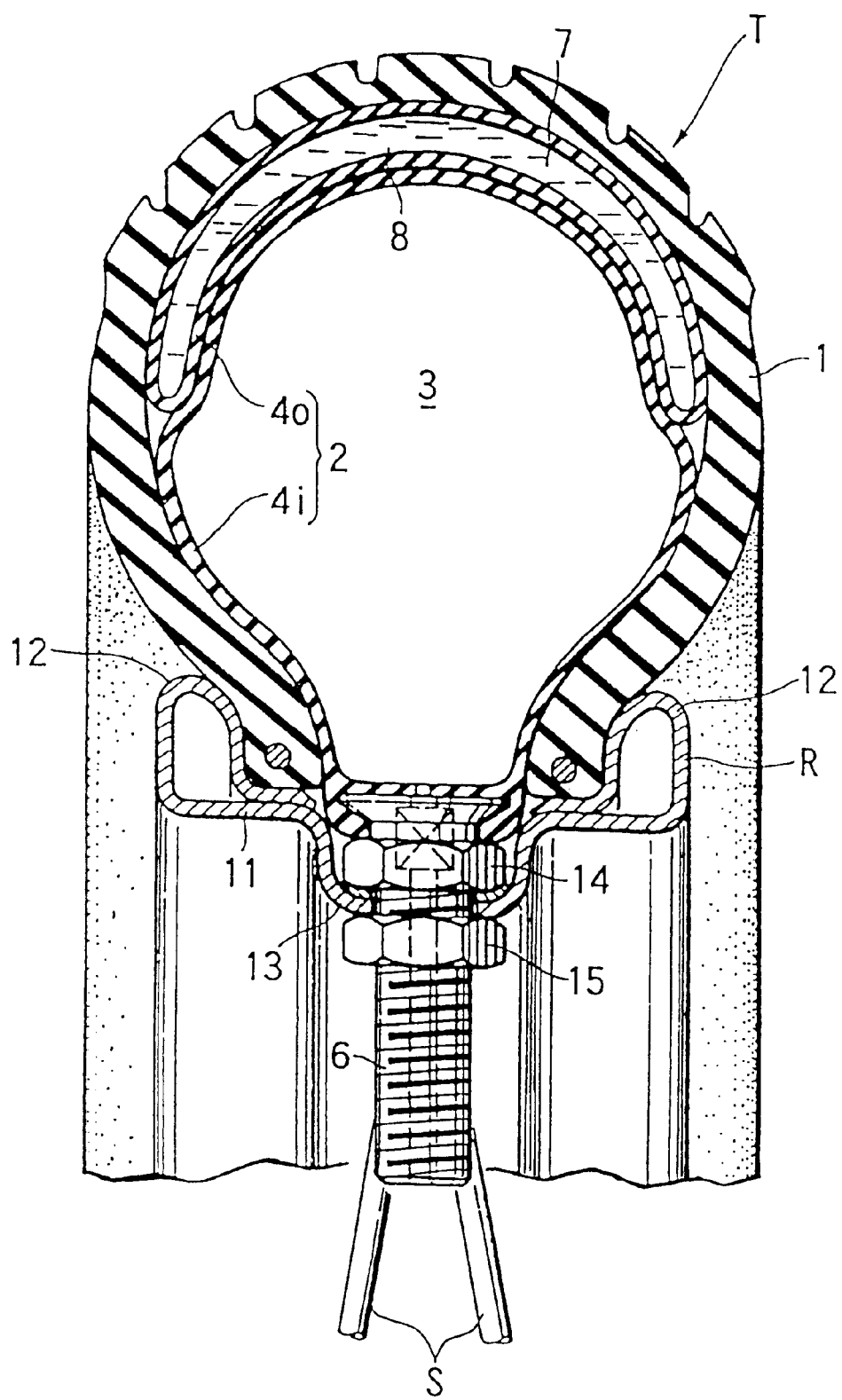
FIG. 1 is a transverse sectional view of a wheel having a tube tire.

FIGS. 1 to 6 illustrate a preferred embodiment of the present invention. As shown in FIG. 1, a rim R of a wheel for a motorcycle is connected through a plurality of wire spokes S to a hub (not shown). A tube tire T consisting of a tire 1 and a tube 2 accommodated in the tire 1 is mounted on the rim R. The tube 2 is composed of a first tube half 4$i$ having a substantially circular shape in cross section and a second tube half 4$a$ having a substantially arcuate shape (circular shape in its free condition) in cross section. The first tube half 4$i$ is located on the radial inside portion of the tire 1, and the second tube half 4$o$ is located on the radially outside of the tire 1. The outer surfaces of the first and second tube halves 4$i$ and 4$o$ are joined together at their substantially half circumferences.

Air is charged in an air chamber 3 defined inside the first tube half 4$i$, and a known liquid sealant 8 is charged in a sealant chamber 7 defined inside the second tube half 4$o$. An air valve 6 for charging air into the air chamber 3 is provided at a radial inside portion of the first tube half 4$i$.

The rim R is provided with an annular rim body portion 11 extending in the circumferential direction of the tube tire T and a pair of flange portions 12 extending radially outwardly from the axial opposite ends of the rim body portion 11 to retain the inner circumference of the tire 1. The air valve 6 provided on the tube 2 to charge air into the air chamber 3 is passed through an air valve mounting portion 13 formed at one circumferential position of the rim body portion 11, and is fixed to the air valve mounting portion 13 by nuts 14 and 15.

The sealant chamber 7 of the tube 2 is maintained to have a shape along the inner surface of the tire 1 by the air pressure in the air chamber 3. Accordingly, even when a centrifugal force due to rotation of the wheel is applied to the sealant 8 charged in the sealant chamber 7, the sealant 8 can be prevented from being deflected to the outer circumferential side of the tube 2. Accordingly, in the event that the tube 2 is pierced by a nail or the like, a puncture can be quickly filled up with the sealant 8 and repaired to thereby retard leakage of the air from the air chamber 3. Further, the sealant 8 is encapsulated in the sealant chamber 7, and does not flow out to the air chamber 3. Therefore, there is no possibility that the sealant 8 may plug the air valve 6 and a pressure gauge or the like attached to the air valve 6.

Figure 6:
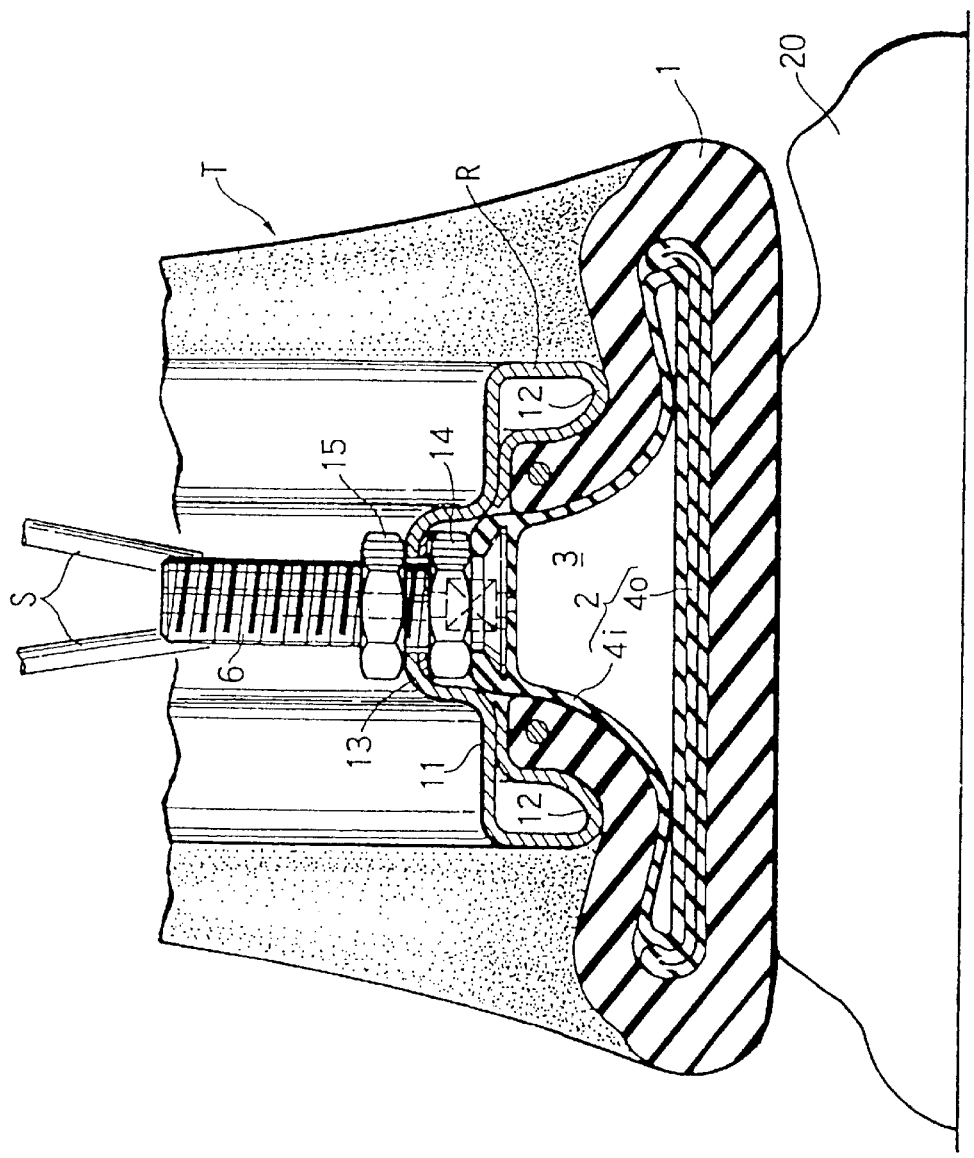
FIG. 6 is a sectional view showing the operation when the tire encounters an obstacle.

When the tube tire T encounters an obstacle 20 on a road surface to receive an impact load as shown in FIG. 6, the tire 1 and the tube 2 are partially compressed in their radial direction by this load. At this time, the tire 1 and the tube 2 are nipped between the radially outwardly projecting flange portions 12 of the rim R and the obstacle 20, so that the opposed inner wall surfaces of the tube 2 come into contact with each other. However, the wall thickness of the tube 2 pressed by the tire 1 is increased by the first tube half 4i having become two layers and the second tube half 4o also having become two layers, thereby improving the strength of the tube 2. Accordingly, damage to the tube 2 due to striking of the rim thereagainst can be effectively prevented.

Furthermore, since the sealant 8 is charged in the sealant chamber 7, a shock absorbing effect is exhibited by movement of the sealant 8 upwardly relative to the tube 2 due to compression of the sealant chamber 7 in the vicinity of an obstacle contact portion of the tire 1. Accordingly, damage to the tube 2 due to rim striking can be more effectively prevented. Further, even if the tube 2 is damaged by rim striking, the damage to the tube 2 can be repaired by the sealant 8 charged in the sealant chamber 7, thereby preventing leakage of air from the air chamber 3.

Figure 2:
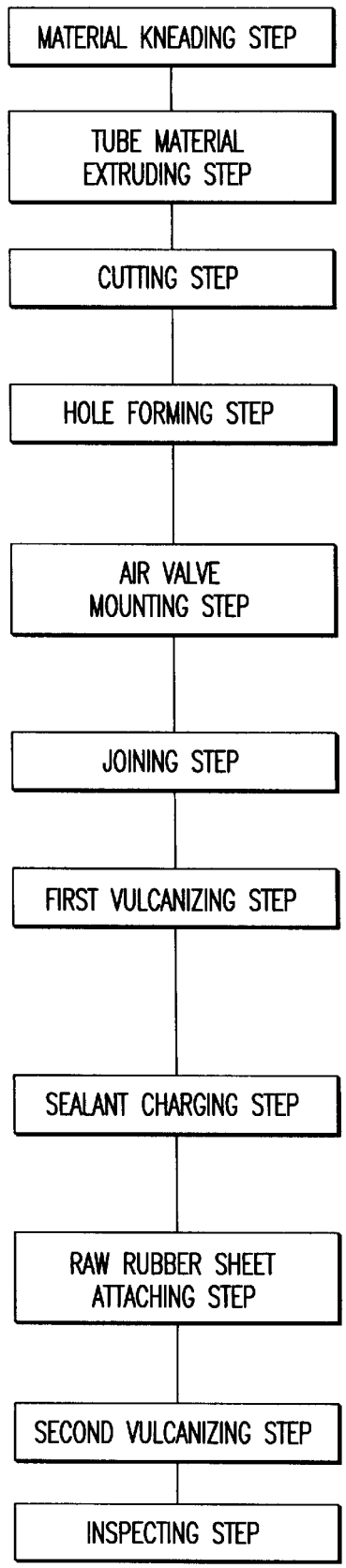
FIG. 2 is an illustration of a manufacturing process for a tube.
Figure 2:
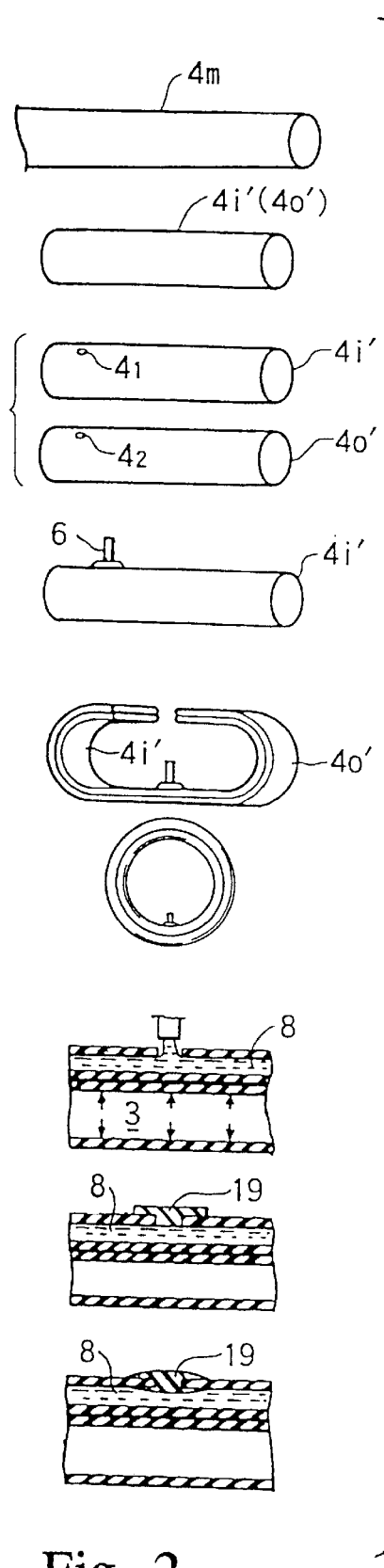

A manufacturing method for the tube 2 will now be described. As shown in FIG. 2, the manufacturing process for the tube 2 is composed of a material kneading step, tube material extruding step, cutting step, hole forming step, air valve mounting step, joining step, first vulcanizing step, sealant charging step, raw rubber sheet attaching step, second vulcanizing step, and inspecting step.

First, a kneaded material obtained in the material kneading step is extruded in the tube material extruding step to thereby obtain a sectionally circular tube material 4m of raw rubber. In the next cutting step, the tube material 4m is cut into pieces each having a given length to thereby obtain a first tube half material 4i' and a second tube half material 4o' of the same size. In the next hole forming step, an air valve mounting hole $4_1$ is formed through the first tube half material 4i', and a sealant charging hole $4_2$ is formed through the second tube half material 4o'. In the next air valve mounting step, the air valve 6 is mounted into the air valve mounting hole $4_1$.

Figure 3:
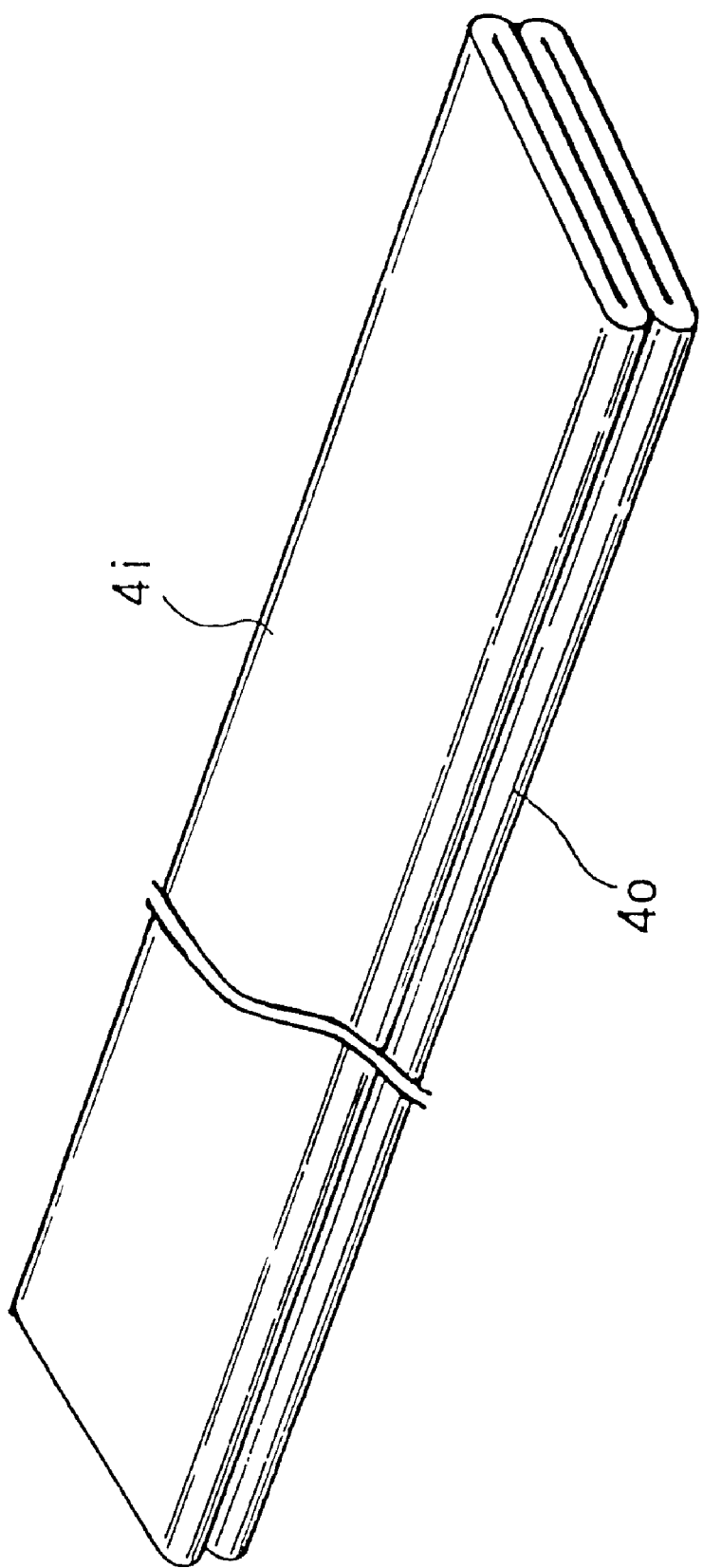
FIG. 3 is a perspective view showing a joined condition of the outer circumferential surfaces of two tube half materials.
Figure 4:
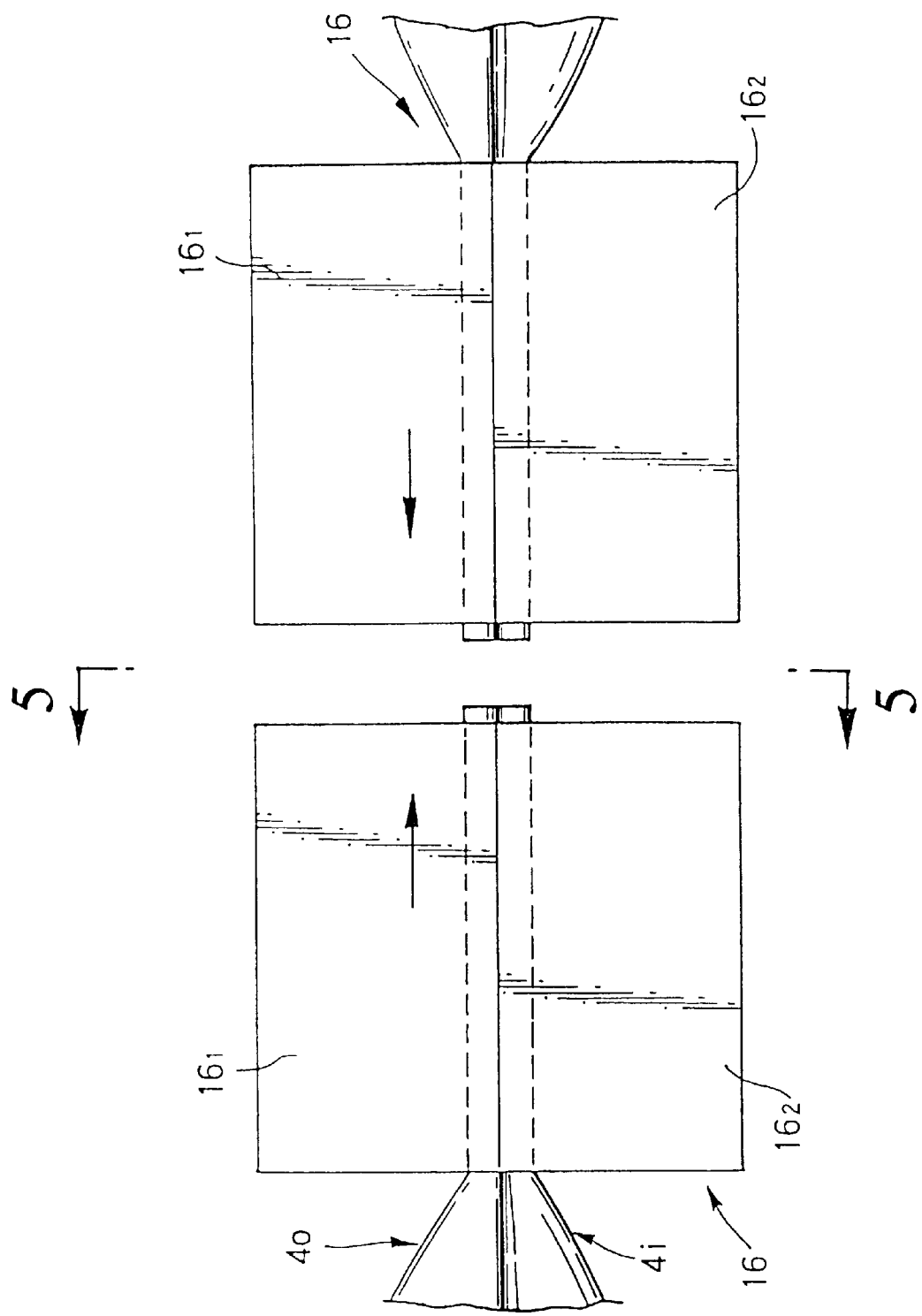
FIG. 4 is a plan view showing a joining condition of the opposite ends of the two tube half materials.
Figure 5:
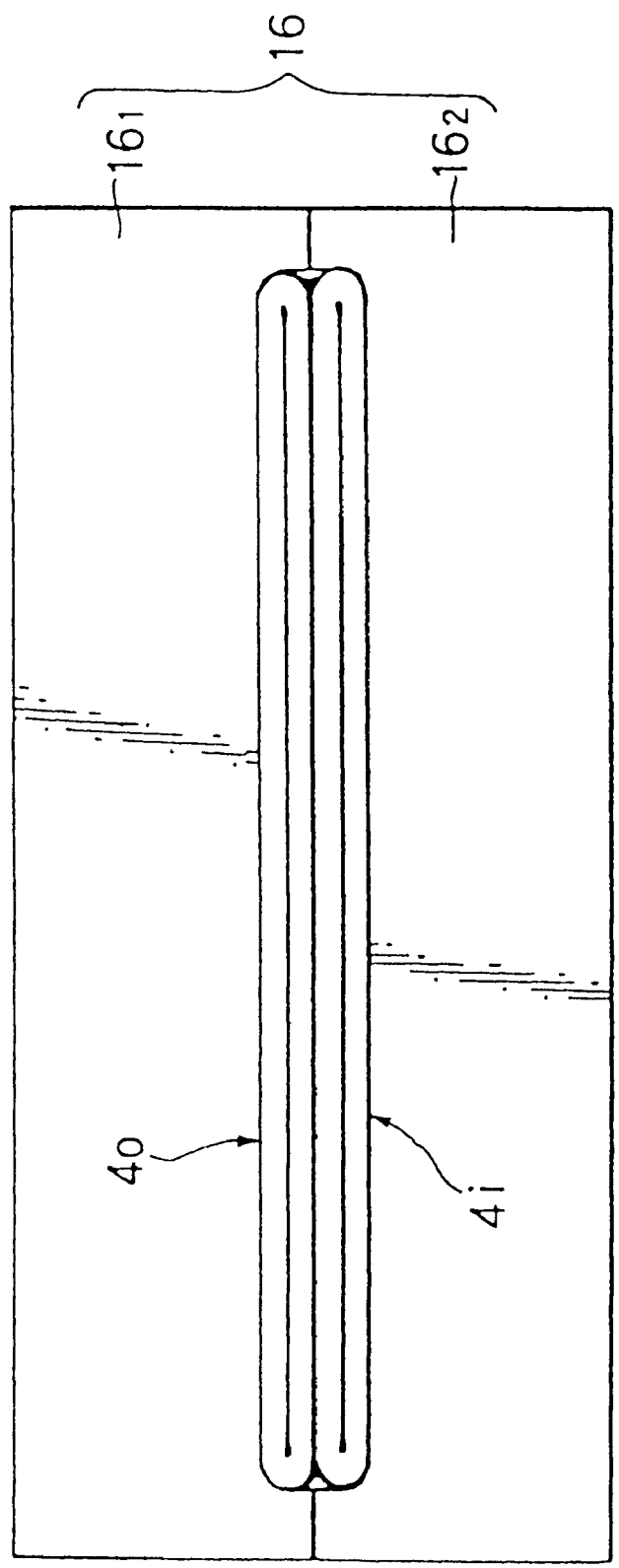
FIG. 5 is a cross section taken along the line V—V in FIG. 4.

In the next joining step, the first tube half material 4i' and the second tube half material 4o' are overlaid relative to each other and pressed to be flattened as shown in FIG. 3. The opposite end portions of the first and second tube half materials 4i' and 4o' are next clamped by clamps 161 and 162 of splicers 16 to join the opposite end surfaces of the two half materials 4i' and 4o'. Since the first and second tube half materials 4i' and 4o' have the same diameter and the same length, the fabrication and joining operations therefor can be easily carried out. While the opposite end surfaces of the first and second tube half materials 4i' and 4o' are simultaneously joined together in this preferred embodiment, the joining of the opposite end surfaces of the first tube half material 4i' and the joining of the opposite end surfaces of the second tube half material 4o' may be separately carried out.

In the next first vulcanizing step, the first and second tube half materials 4i' and 4o' joined together are inserted into a heating mold, and heated air or high-temperature steam is supplied from the air valve 6 into the air chamber 3 in the first tube half material 4i', thereby making the half circumference of the first tube half material 4i' and the half circumference of the second tube half material 4o' into close contact with the heating mold, and making the remaining half circumferences of the two tube half materials 4i' and 4o' into close contact with each other. In this condition, the heating mold is heated to carry out vulcanization. That is, in the hole forming step, the sealant charging hole 42 is formed through the second tube half material 4o'. Accordingly, when the first tube half material 4i' is expanded by the heated air or high-temperature steam supplied, air is expelled from the inside of the second tube half material 4o' pressed by the first tube half material 4i' through the sealant charging hole $4_2$. As a result, the first and second tube half materials 4i' and 4o' come into close contact with each other, and are vulcanized in this condition.

In this manner, the first tube half material 4i' and the second tube half material 4o' are joined and vulcanized in the condition of raw rubber to thereby improve the strength of the tube 2 obtained by completely integrating the two tube half materials 4i' and 4o'.

In the next sealant charging step, the sealant 8 is charged from the sealant charging hole 42 into the sealant chamber 7 in the second tube half material 4o'. Prior to charging the sealant 8, air is supplied from the air valve 6 into the air chamber 3 to expand the air chamber 3, thereby completely expelling the air out of the sealant chamber 7. In this condition, the charging of the sealant 8 is started. By thus starting the charging of the sealant 8 in the condition that the air in the sealant chamber 7 has been completely expelled, mixing of air with the sealant 8 can be effectively prevented, and only the sealant 8 can be charged. Further, since air is supplied into the air chamber 3 by utilizing the air valve 6, it is unnecessary to form an air charging hole through the first tube half material 4i'.

In the next raw rubber sheet attaching step, a raw rubber sheet 19 is attached so as to cover the sealant charging hole 42. In the next second vulcanizing step, the raw rubber sheet 19 is locally vulcanized in the vicinity thereof to close the sealant charging hole 42, thus completing the tube 2. Since the raw rubber sheet 19 of the same material as that of the tube 2 is used to close the sealant charging hole 42, the strength of the closed portion can be improved to thereby effectively prevent leakage of the sealant 8. In the final inspecting step, the completed tube 2 is inspected to end the manufacturing process.

The first tube half material 4i' and the second tube half material 4o' have the same size, so that the sealant chamber 7 can be formed over substantially half of the circumference of the completed tube 2 as viewed in transverse section. Accordingly, even when any portion of the tread of the tire 1 is pierced by a nail or the like, the puncture can be prevented. If the second tube half material 4o' is smaller in diameter than the first tube half material 4i', the sealant chamber 7 becomes small, so that when a side portion of the tire 1 is pierced, the puncture cannot be prevented. On the contrary, if the second tube half material 4o' is larger in diameter than the first tube half material 4i', the opposite side portions of the sealant chamber 7 project from the air chamber 3, so that the transverse sectional shape of the tube 2 as a whole becomes noncircular.

Having thus described a specific embodiment of the present invention, various design changes may be made without departing from the scope of the present invention.

As described above, according to the present invention, the sealant chamber filled with the sealant is provided radially outside of the air chamber. Accordingly, even when the tube is pierced by a nail or the like, a puncture can be quickly repaired by the sealant to thereby prevent leakage of the air from the air chamber. Further, since it is unnecessary to break a capsule in the tube, there is no possibility that the tube may be damaged upon breakage of the capsule. Further, when a radial load is applied to the tire, the tube pressed against the rim A through the tire becomes four layers, thereby improving the strength of the tube to prevent damage to a rim striking portion of the tube. Further, the first tube half and the second tube half are joined together as raw rubber, and thereafter vulcanized. Accordingly, the two tube halves can be completely integrated in a seamless condition. Further, the tube is simple in structure obtained by joining the first tube half and the second tube half each having a simple circular cross section, and charging the sealant into the sealant chamber defined in the second tube half. Accordingly, no increases in weight and manufacturing cost are invited.

According to the present invention, the first tube half and the second tube half have the same diameter in their free condition. Accordingly, the two tube halves can be easily manufactured and joined. In addition, the sealant chamber of the completed tube can be extended to the opposite side walls of the tire.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of forming a tube tire comprising the steps of:
    forming a first tube half being made of raw rubber and having a circular cross section, said first tube half having a first end and a second end;
    forming a second tube half being made of raw rubber and having a circular cross section, said second tube half having a first end and a second end;
    forming an air valve mounting hole in said first tube half;
    forming a sealant charging hole in said second tube half;
    joining the first and second ends of said first tube half to form a first tube after the forming of said air valve mounting hole;
    joining the first and second ends of said second tube half to form a second tube after the forming of said sealant charging hole;
    vulcanizing said first tube half and said second tube half to join said first and second tube halves together;
    filling an air chamber formed within said first tube half with air;
    filling a sealant chamber formed within said second tube half with a sealant; and
    inserting said joined first and second tube halves within a tire to form the tube tire.

2. The method of forming a tube tire according to claim 1, and further including the step of forming said first tube half and said second tube half to have the same diameter.

3. The method of forming a tube tire according to claim 1, and further including the step of providing a valve operatively connected to said first tube half for supplying air to said air chamber wherein said valve is not plugged with sealant if said tube tire is punctured.

4. The method of forming a tube tire according to claim 3, wherein said step of providing a valve is performed before said joining and vulcanizing steps.

5. The method of forming a tube tire according to claim 3, wherein said step of vulcanizing further comprises the steps of:
    inserting said first and second tube halves into a heated mold; and
    supplying heated air or high-temperature steam from the valve into the air chamber in the first tube half, wherein the first and second tube halves are brought into close contact with each other for vulcanizing.

6. The method of forming a tube tire according to claim 1, and further including the step of disposing said second tube half on an outer peripheral surface of said first tube half and between said first tube half and an inner peripheral surface of said tire.

7. The method of forming a tube tire according to claim 1, further comprising the step of forming, upon impacting with an obstacle, said tire, said first tube half and said second tube half into an area of increased thickness to prevent damage due to rim striking.

8. The method of forming a tube tire according to claim 1, and further including the step of forming said first tube half and said second tube half to be the same length.

9. The method of forming a tube tire according to claim 1, further comprising the step of forming said first tube and said second tube seamless by said step of vulcanizing.

10. The method of forming a tube tire according to claim 1, further comprising the steps of:
    attaching a raw rubber sheet to cover said sealant charging hole after said step of filling the sealant chamber; and
    vulcanizing the vicinity of said attached raw rubber sheet to provide a strong closed portion which prevents leakage of sealant therethrough.

11. The method of forming a tube tire according to claim 1, wherein said step of filling the sealant chamber is performed after said step of filling the air chamber, wherein all of the air is exhausted out of said sealant chamber prior to said step of filling the sealant chamber by said step of filling the air chamber to ensure that substantially only sealant is present in said sealant chamber.

* * * * *